Aug. 13, 1968 W. J. WITWER ET AL 3,396,860
EXCAVATOR AND GRADER OR CRANE APPARATUS
Filed April 12, 1966 10 Sheets-Sheet 1
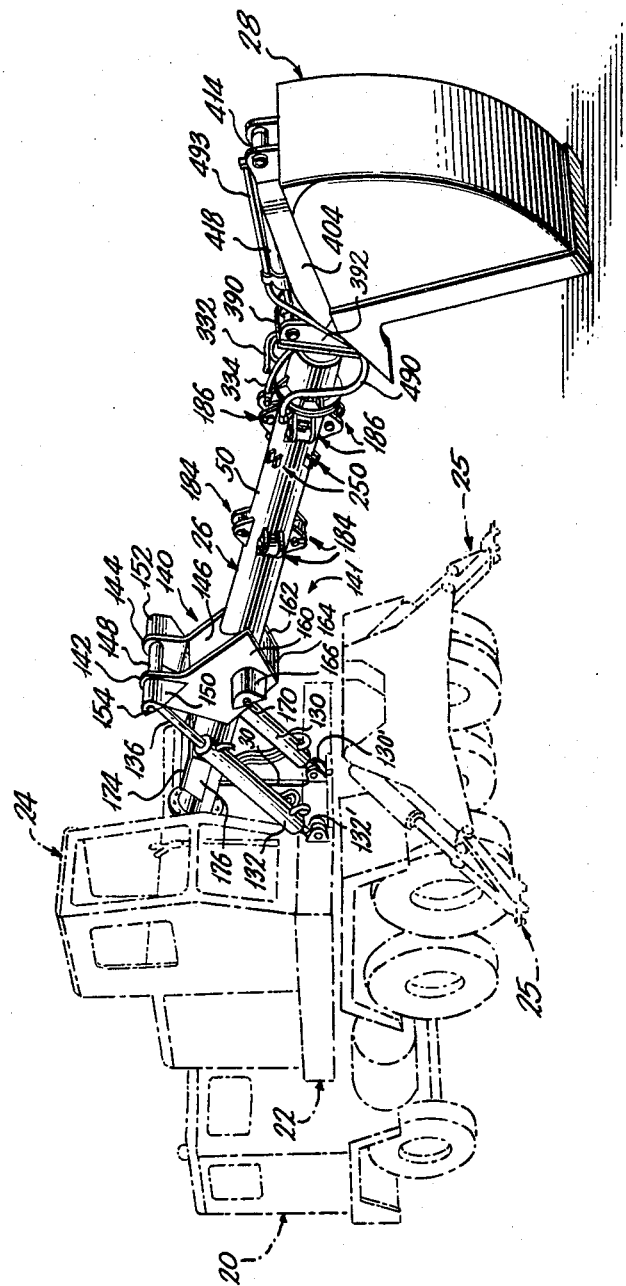
INVENTORS
Wallace J. Witwer
BY & Jay V. Wright
Shoemaker and Mattare
ATTORNEYS

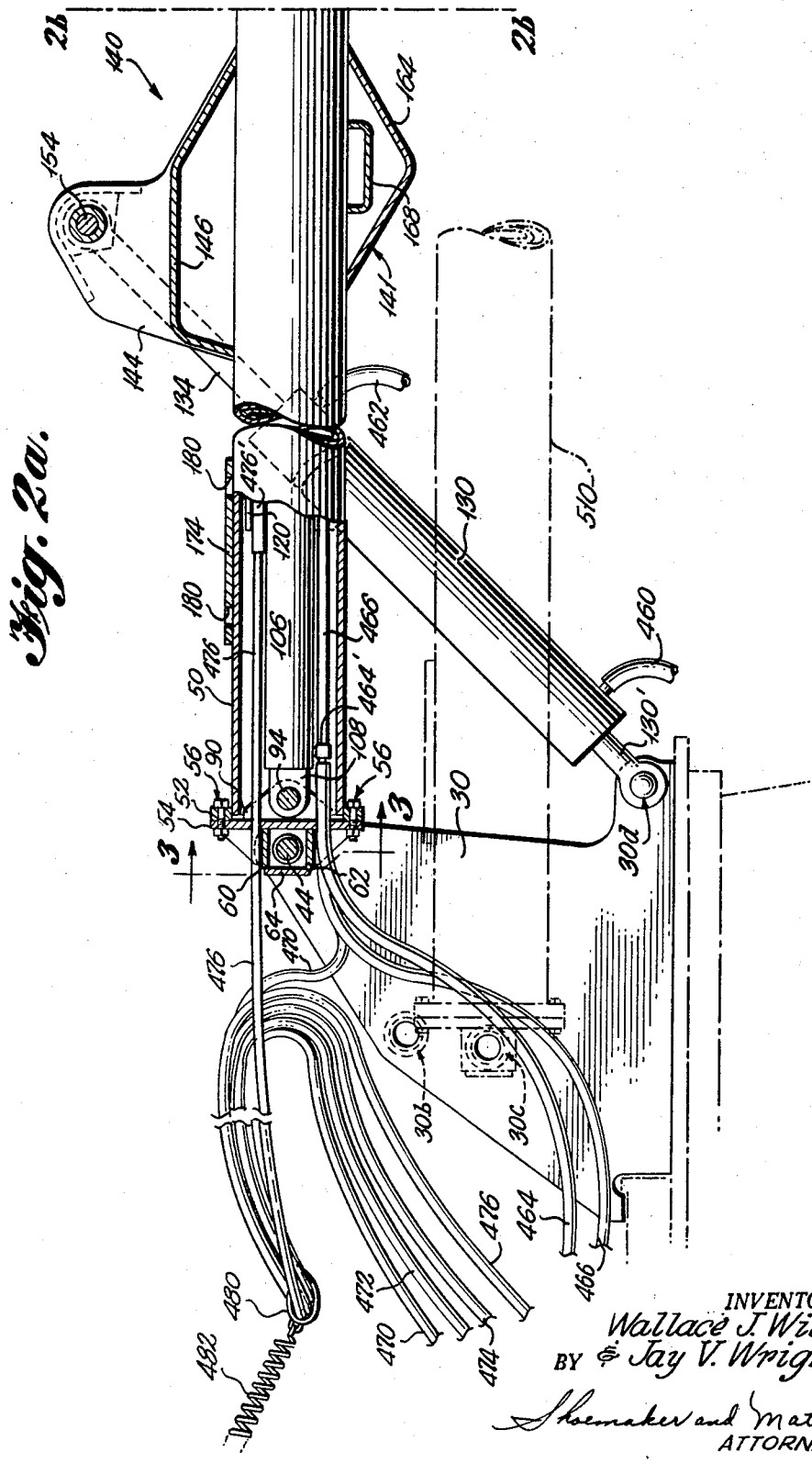

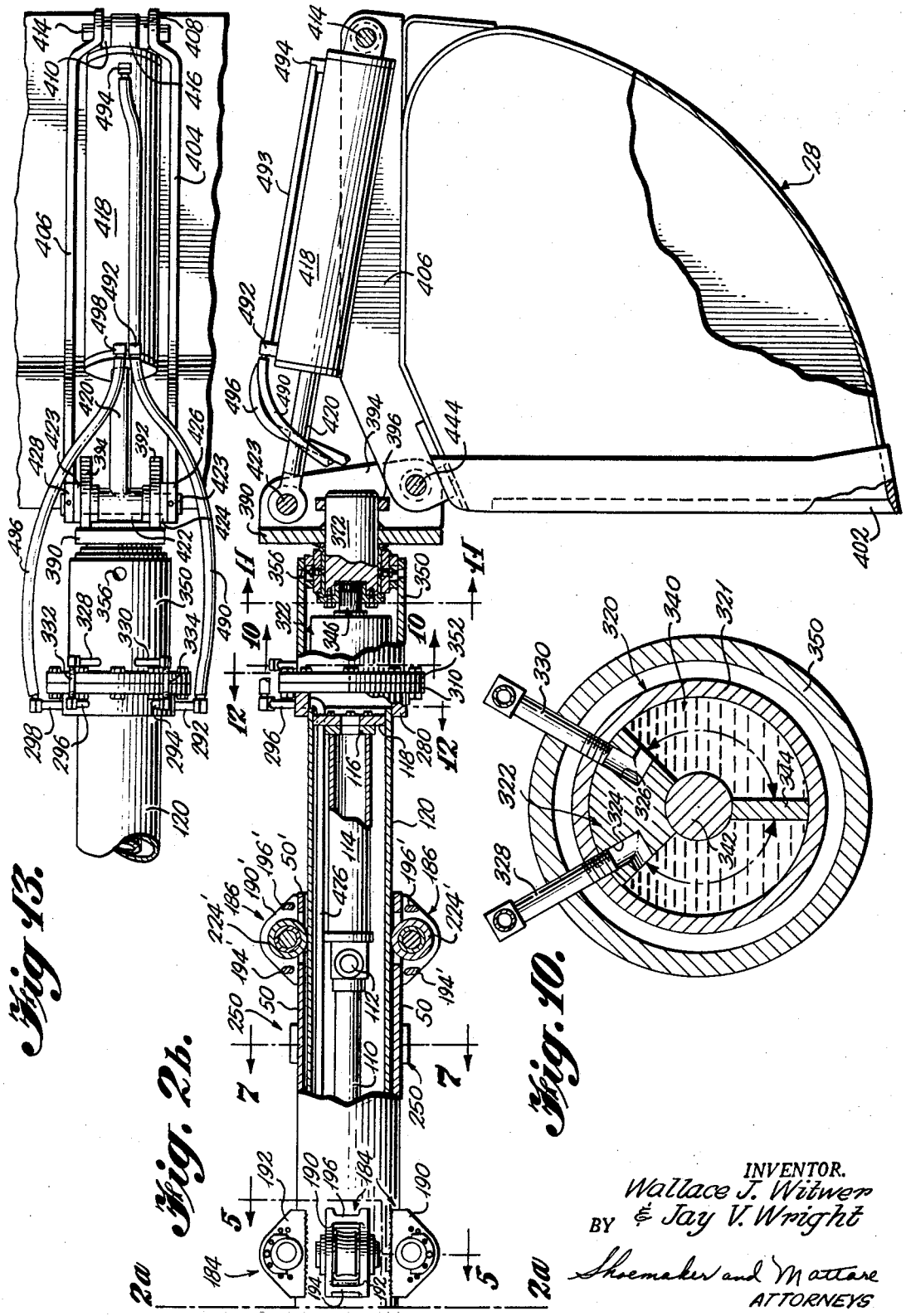

INVENTOR.
Wallace J. Witwer
BY & Jay V. Wright

Shoemaker and Mattare
ATTORNEYS

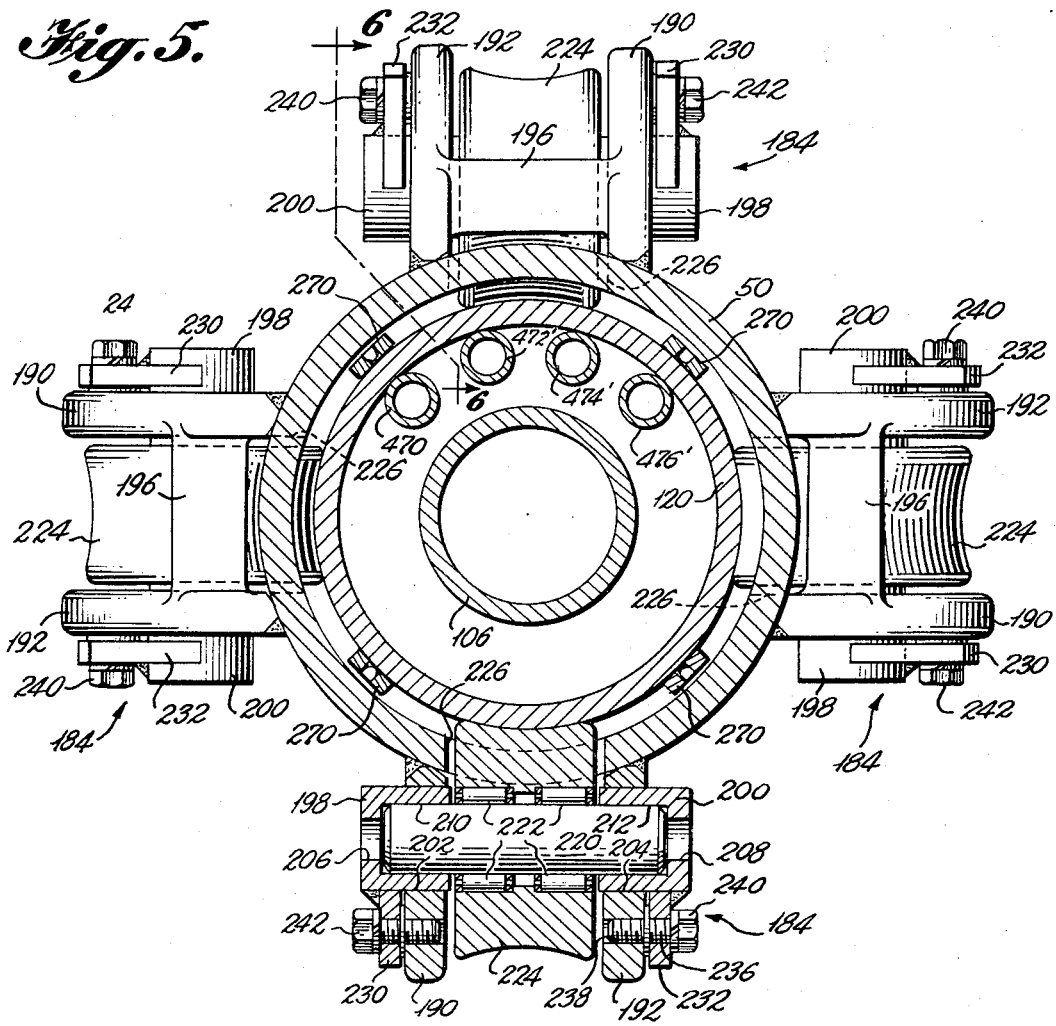
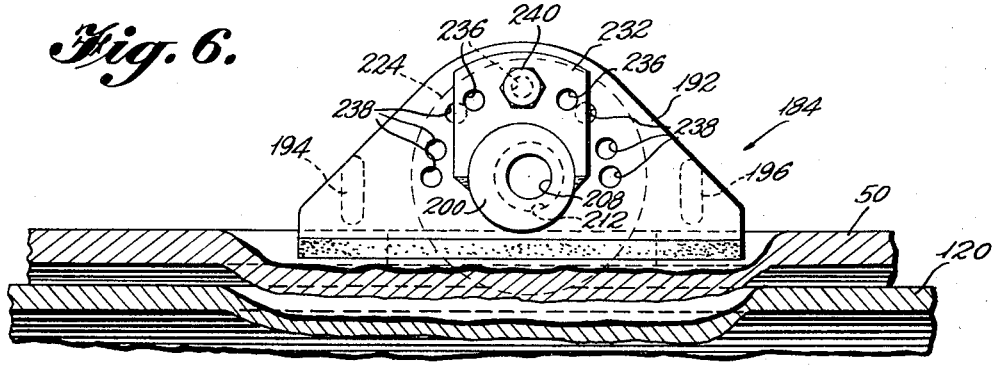

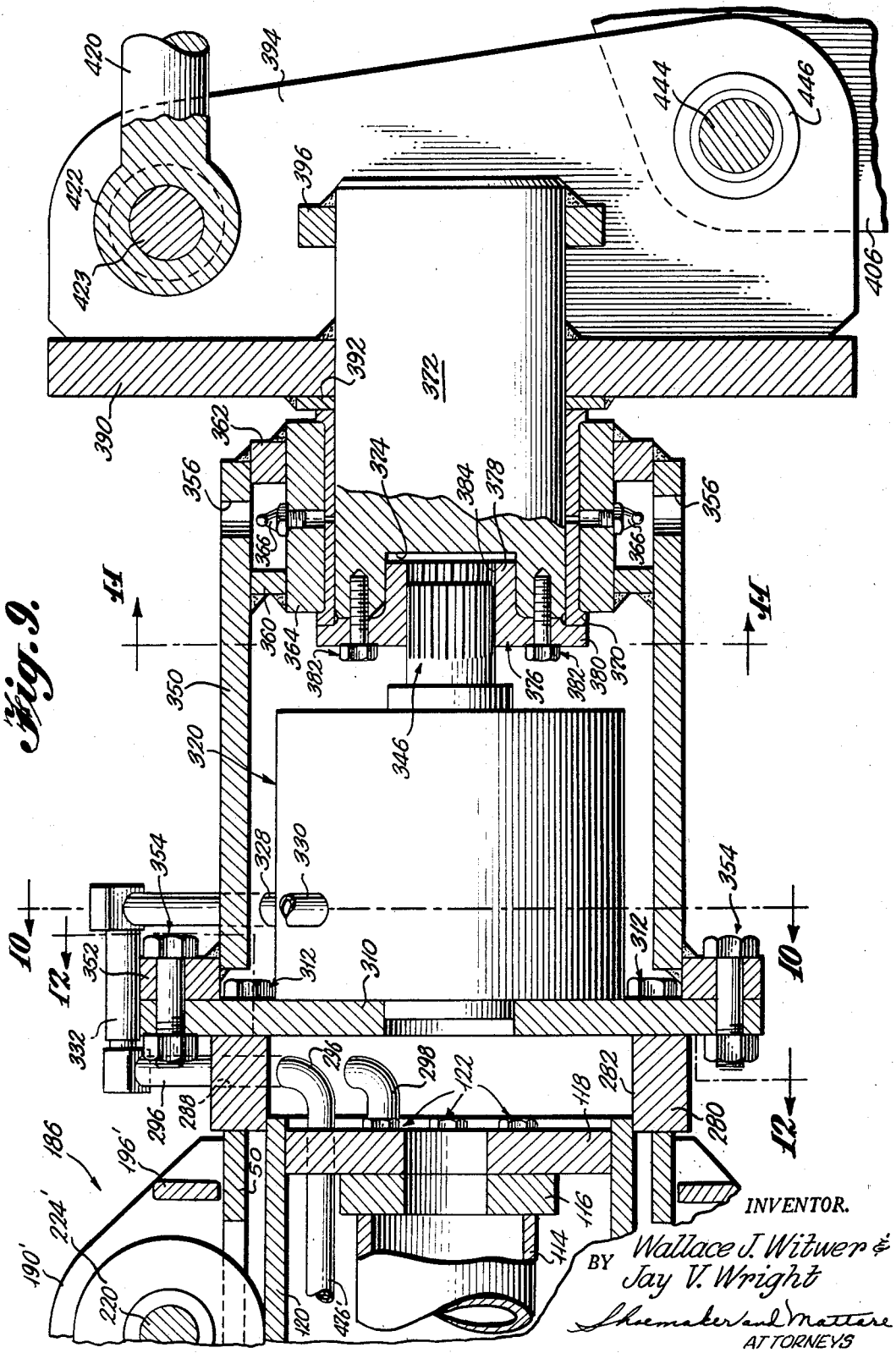

Aug. 13, 1968  W. J. WITWER ETAL  3,396,860

EXCAVATOR AND GRADER OR CRANE APPARATUS

Filed April 12, 1966  10 Sheets-Sheet 8

INVENTORS
Wallace J. Witwer &
BY Jay V. Wright

Shoemaker and Mattare
ATTORNEYS

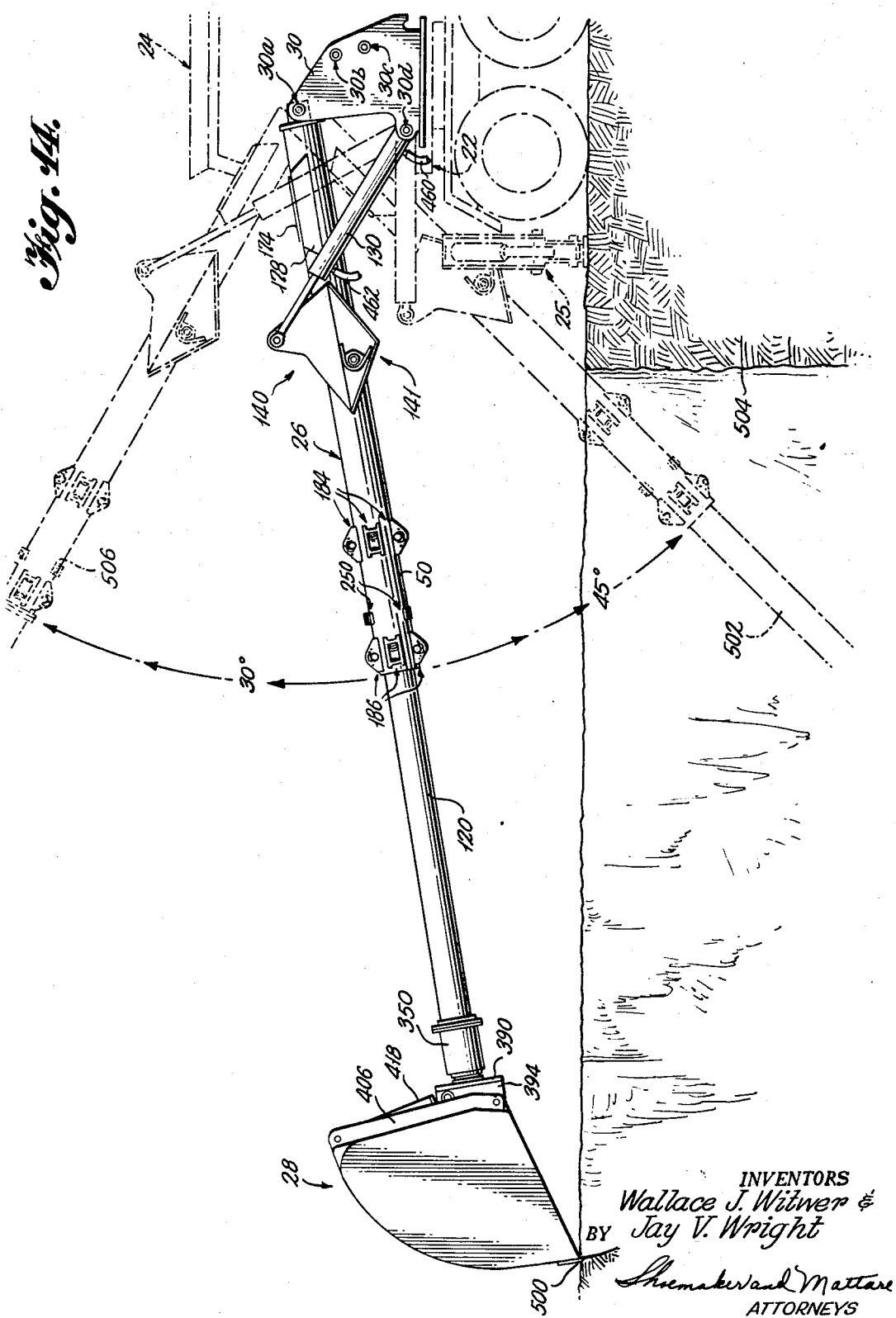

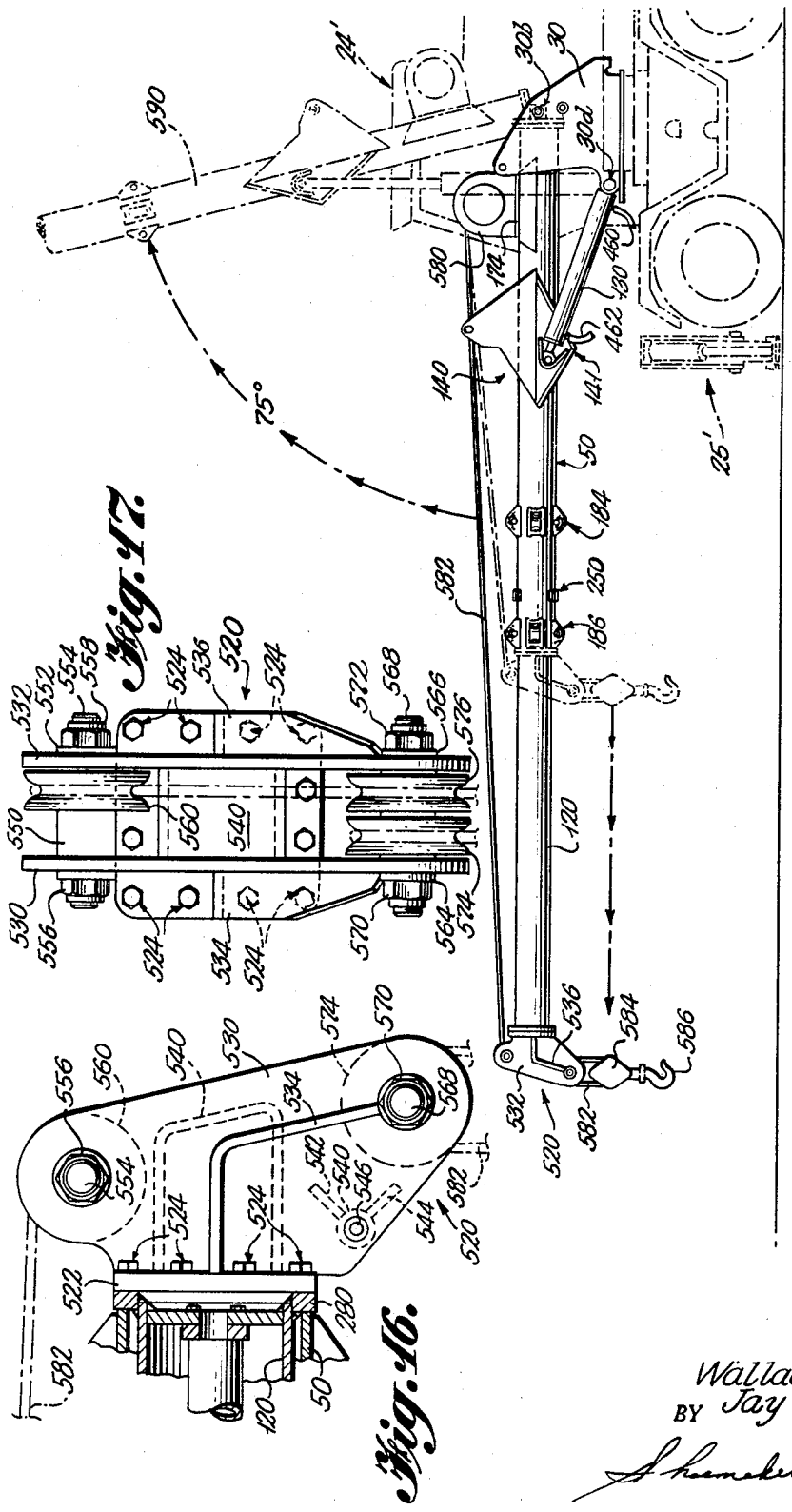

United States Patent Office 3,396,860
Patented Aug. 13, 1968

3,396,860
EXCAVATOR AND GRADER OR CRANE APPARATUS
Wallace J. Witwer, Waukesha, and Jay V. Wright, Menomonee Falls, Wis., assignors to Hein-Werner Corporation, Waukesha, Wis., a corporation of Wisconsin
Filed Apr. 12, 1966, Ser. No. 541,998
19 Claims. (Cl. 214—141)

ABSTRACT OF THE DISCLOSURE

A telescoping boom is mounted on a mobile vehicle and includes inner and outer cylindrical boom members. Hydraulic ram means is pivotally interconnected with the outer boom member at either an upper connecting means or a lower spaced connecting means. Anti-friction means and guide means are provided to direct movement of the inner boom member. A suitable tool such as a shovel may be rotatably and pivotally supported at the outer end of the boom.

---

The present invention relates to a new and novel excavator and grader or crane apparatus, and more particularly to such apparatus which may be readily converted for efficient operation either as an excavator and grader or as a crane.

The apparatus of the present invention is especially adapted for use with movable vehicles such as may be mounted either upon wheels or crawler mechanism or the like. This type of a movable vehicle is adapted to be moved from place to place for utilization in different types of operations.

It is accordingly desirable to provide an arrangement wherein the apparatus is adapted to incorporate different attachments thereon which are suitable for carrying out different functions.

For example, a first attachment means is suitable for excavating and grading. With this type of attachment means, maximum versatility is obtained by utilizing a structure wherein the tool in the form of a bucket or the like is mounted for rotation at the outer end of an extensible boom. With the bucket or tool so mounted, it can be moved into various positions of angularity which is particularly useful when grading or forming V-shaped trenches and the like. Additionally, the tool or bucket is mounted for pivotal movement at the outer end of the boom so that it may be moved into many different operative positions.

In the past, it has been considered desirable to provide an arrangement wherein the tool at the outer end of the boom is adapted to be rotated. However, in the prior art, these tools have been secured to the outer end of the boom so that it is necessary to rotate a portion of the boom itself in order to obtain the results obtained with the present invention. Such rotation of a boom portion itself is undesirable since heavy special bearings are required to permit such relative rotation of one boom portion with respect to another. This disadvantage is eliminated in the present invention since the boom portions themselves are actually fixed against relative rotation with respect to one another and move only in a longitudinal direction relative to one another.

In addition, in prior art arrangements, it has been necessary to provide special complex linkages from the power-operated ram means on the boom to the pivoted tool at the outer end of the boom. This type of special linkage is eliminated in the present invention wherein the power-operated means is pivotally interconnected directly between the tool and a tool support means which in itself is rotatably mounted at the outer end of the boom.

The boom means of the present invention incorporates substantially cylindrical boom members which are adapted to take loading in all directions and thereby provides a structure of maximum strength regardless of the direction of loading applied thereto.

The attachment mounting means at the outer end of the inner boom portion of the present invention is also adapted to receive a crane attachment means. The boom means further includes winch support means so that when the apparatus is being employed as a crane apparatus, a winch may be mounted on the boom for connection with a cable reeved over sheave means supported by the crane attachment means.

In order to enable the apparatus to operate efficiently, both as an excavator, grader or crane apparatus, it is necessary to provide a novel arrangement wherein the boom means may be pivotally supported at different points on support means. Additionally, the power-operated lift means in the form of hydraulic rams pivotally connected with the boom means is adapted to be pivotally interconnected with different portions of a lift connecting means mounted on the boom means.

Accordingly, the boom means may be pivotally supported at different positions and the power-operated lift means may be pivotally interconnected with different portions of the connecting means on the boom in accordance with the position at which the boom means itself is pivotally supported on the support means. In this manner, desired swinging movements of the boom through a relatively wide angle are obtained, the swinging movements being adjustable in accordance with the intended function of the apparatus for a particular job.

An object of the present invention is to provide new and novel excavator and grader or crane apparatus which can be readily converted for efficient operation either as an excavator, grader or as a crane.

Another object of the invention is the provision of an excavator and grader or crane apparatus including a boom construction which is adapted to take loading equally well in all directions.

Still another object of the invention is to provide excavator and grader or crane apparatus including tool means mounted at the outer end of the boom for rotation with respect to the boom to provide maximum versatility for the apparatus.

A further object of the invention is the provision of excavator and grader or crane apparatus wherein the various boom portions only move longitudinally relative to one another and do not rotate relative to one another thereby eliminating the necessity of providing special bearings as are required in the prior art to permit relative rotation of various boom portions.

A still further object of the invention is the provision of excavator and grader or crane apparatus wherein no special linkages are required from the power-operated means for the tool and the tool itself for producing pivotal movement of the tool about the tool support means mounted at the outer end of the boom.

Other objects and many attendant advantages of the invention will become more apparent when considered in connection with the specification and accompanying drawings, wherein:

FIG. 1 is a perspective view of the apparatus mounted for use as an excavator and grader and having an excavator and grader attachment at the outer end of the boom;

FIGS 2a and 2b in conjunction with one another illustrate a longitudinal section through the boom and a portion of the attachment means at the outer end thereof as seen in FIG. 1;

FIG. 5 is a sectional view taken substantially along line 5—5 of FIG. 2b looking in the direction of the arrows;

FIG. 6 is a sectional view taken substantially along line 6—6 of FIG. 5 looking in the direction of the arrows;

FIG. 9 is an enlarged view taken in longitudinal section through the outer end of the boom and the excavator and grader attachment means illustrating the details of construction thereof;

FIG. 10 is a sectional view taken substantially along line 10—10 of FIG. 9 looking in the direction of the arrows;

FIG. 13 is a top view of the right-hand portion of FIG. 2b partly broken away and illustrating in particular the manner of attachment of the power-operated means between the tool and the tool support means;

FIG. 14 is a side view illustrating the degree of swinging of the boom means obtained when the apparatus is mounted in a particular operative relationship for use as an excavator and grader;

FIG. 15 is a side view similar to FIG. 14 illustrating the apparatus in operative relationship for use as a crane;

FIG. 16 is an enlarged view partly in section of the crane attachment means; and FIG. 17 is an end view of the crane attachment means shown in FIG. 16.

Figure 3:
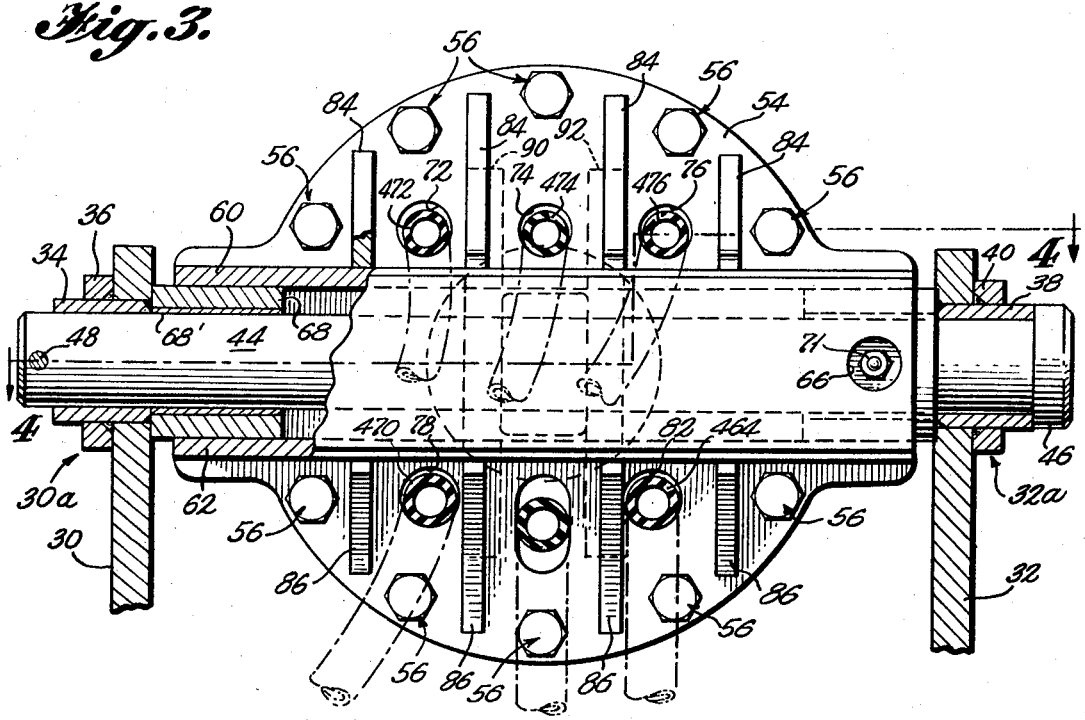
FIG. 3 is a sectional view taken substantially along line 3—3 of FIG. 2a looking in the direction of the arrows.

Referring now to the drawings wherein like reference characters designate corresponding parts throughout the several views, FIGS. 1 through 14 inclusive illustrate the apparatus in assembled relationship for use as an excavator and grader mechanism, while FIGS. 15–17 illustrate the apparatus in assembled relationship for use as a crane. It should be understood at the outset that the apparatus may be used solely as an excavator and grader or as a crane, but that the support and boom arrangement of the present invention is especially useful in applications wherein it is desired to convert the apparatus from one use to another. It is apparent that when the apparatus is mounted in a particular manner such as on a wheeled vehicle or a crawler type vehicle, it may be readily converted from one use to another, and further that the apparatus is suitable for mounting in many different ways. While the crane arrangement shown in FIGS. 15–17 is illustrated as mounted upon a slightly different type of vehicle than that shown in FIG. 1, it is readily apparent that the type of mounting and vehicle associated with the apparatus may be widely varied while still incorporating the concepts of the present invention.

As seen particularly in FIGS. 1 and 14, a self-propelled wheeled vehicle is indicated generally by reference numeral 20, this structure being of relatively conventional construction and including a rotatable turntable 22 mounted thereon and having a cab means 24 supported thereabove which is adapted to enclose the operator during use of the apparatus. Suitable control means is provided in the cab means to enable the apparatus of the present invention to be selectively operated. The vehicle may also be provided with relatively conventional jack means indicated generally by reference numeral 25 for engaging the ground to stabilize the vehicle when employing the apparatus. The boom means is indicated generally by reference numeral 26 and a tool indicated generally by reference numeral 28 in the form of a bucket is supported at the outer end of the boom means.

The means for pivotally supporting the inner end of the boom means may be understood with reference to FIGS. 2a, 3, 4 and 14. The support means includes a pair of spaced vertically extending support members or plates 30 and 32 the lower edges of which are fixed to turntable 22. These plates are of substantially identical construction, and as seen most clearly in FIG. 14, each of the plates includes a plurality of spaced support portions, the support portions of plate 30 being indicated by reference numerals 30a, 30b, 30c and 30d. It will be understood that plate 32 is provided with a corresponding plurality of suppor portions in similar locations in plate 32, only portion 32a being visible in the drawings. The support portions 30a, 30b and 30c are each adapted to pivotally support the inner end of the boom means in different positions according to the manner in which the apparatus is to be used, while the fourth pivotal support portion 30d is adapted to pivotally support the inner end of the boom elevating power-operated means hereinafter described.

Figure 4:
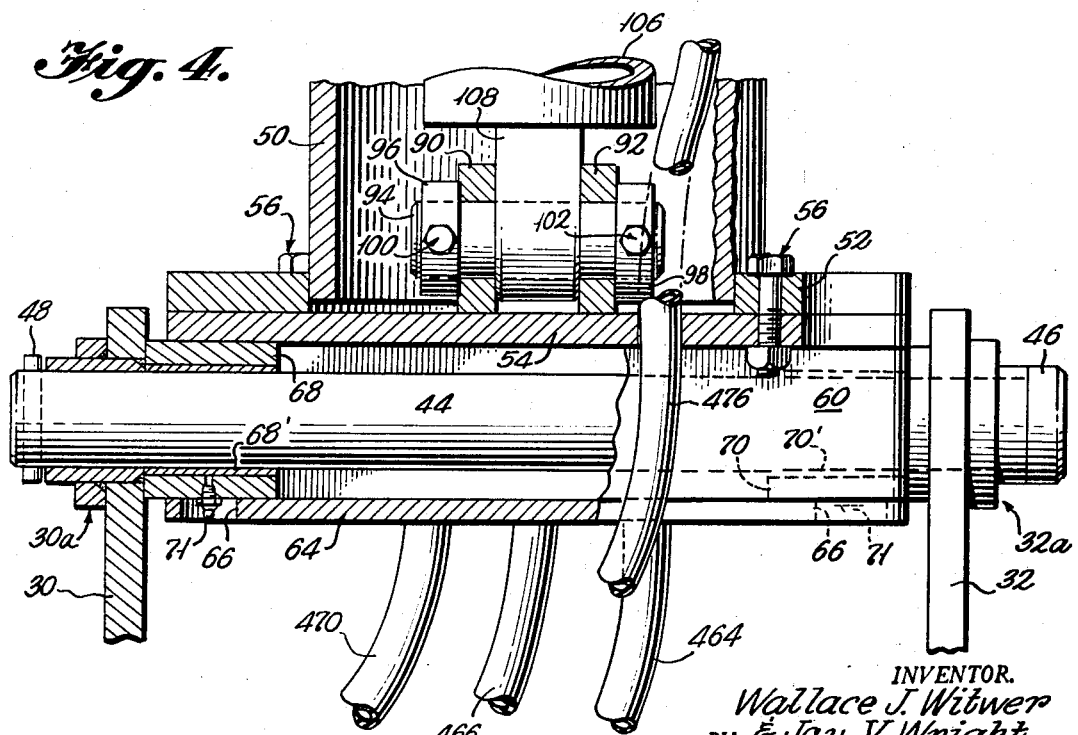
FIG. 4 is a sectional view taken substantially along line 4—4 of FIG. 3 looking in the direction of the arrows.

As seen most clearly in FIGS. 3 and 4, support portion 30a includes a cylindrical member 34 suitably secured as by welding within a hole provided in upstanding plate 30, member 34 being surrounded by an annular member 36 which is suitably secured as by welding in the position shown, the over-all arrangement being adapted to support a pivot pin therewithin. In a similar manner, support portion 32a includes a cylindrical member 38 welded in the position shown and a surrounding annular member 40 welded in place. It will be understood that the remaining support portions are substantially identical, it being noted that the support portions for the inner end of the boom means extend outwardly from the associated plates 30 and 32, while the support portions for the inner end of the boom elevating power-operated means extend inwardly toward one another.

A pivot pin 44 provided with an enlarged head 46 is illustrated in FIGS. 3 and 4 as being mounted within the support portions 30a and 32a, and a lock pin 48 extends through a suitable hole provided in the outer end thereof for retaining the pivot pin 44 in the operative position shown. It is apparent that the pivot pin may be supported within different ones of the support portions in the plates 30 and 32 as desired, and as illustrated, the pivot pin is mounted in the uppermost support portions for supporting the boom means in position for operation as an excavator and grader mechanism.

Referring now to FIGS. 2a, 3 and 4, the boom means includes an outer substantially cylindrical portion 50 having a collar member 52 secured to one end thereof as by welding or the like. This collar member surrounds the outer periphery of the boom portion 50 and is complementary in configuration to a plate 54, collar 52 and plate 54 being affixed to one another by nut and bolt assemblies indicated generally by reference numeral 56, these nut and bolt assemblies extending through suitable aligned holes provided in members 52 and 54. As seen in FIG. 3, eight such nut and bolt assemblies are provided.

A pair of substantially parallel generally rectangular members 60 and 62 are fixed to the rear face of plate 54 and extends substantially normally therefrom. The outer edges of members 60 and 62 are interconnected by a flat substantially rectangular member 64, these various members being rigidly interconnected with one another as by welding or the like. A pair of holes 66 are provided in plate 64 for a purpose hereinafter described.

A pair of block-like members 68 and 70 are snugly fitted within opposite ends of the box-like structure provided by members 54, 60, 62 and 64 and are rigidly fixed therein as by welding. Bushings 68' and 70' are fitted within central circular holes provided through members 68 and 70, these bushings serving to rotatably support the inner end of the boom beams on the pin 44 which in turn is supported by plates 30 and 32. Grease fittings 71 communicating with bushings 68' and 70', are accessible through the holes 66 provided in member 64.

As seen particularly in FIG. 3, six holes numbered 72, 74, 76, 78, 80 and 82 are provided through plate 54 for receiving flexible conduits as hereinafter described.

A first plurality of reinforcing gussets 84 are fixed between the rear face of plate 54 and the upper surface of member 60, and a second plurality of reinforcing gussets 86 are fixed between the rear face of plate 54 and the undersurface of member 62, these gusset members being rigidly secured in position as by welding.

As seen particularly in FIG. 4, a pair of ear members 90 and 92 are fixedly secured as by welding to the forward face of plate 54 and are spaced from one another. These ears are provided with central holes receiving a pivot pin 94. The pivot pin is maintained in the operative position shown in this figure by means of a pair of collars 96 and 98 disposed in surrounding relationship thereto and held in place by nut and bolt assemblies 100 and 102 respectively which extend through suitable openings provided in the pivot pin and the associated collars.

Power-operated extending means includes a hydraulic cylinder 106 having an ear 108 rigidly affixed at one end thereof, this ear having a hole formed therein which receives pivot pin 94 whereby the inner end of the power-operated extending means is pivotally interconnected with plate 54, and in this manner also pivotally supported with respect to the inner end of the outer boom portion 50. As seen in FIG. 2b, a piston rod 110 extends outwardly from the hydraulic cylinder 106, it being understood that the inner end of the piston rod is fixed to a piston slidably disposed within the hydraulic cylinder. The outer end of the piston rod 110 is pivotally interconnected at 112 with an inner portion of a tubular adapter means 114. This adapter means is adapted to compensate for bending of the inner boom portion as hereinafter described.

An annular member 116 is rigidly affixed to the outer end of the tubular or cylindrical adapter means 114. An annular member 118 of greater diameter than member 116 is secured to member 116 by a plurality of nut and bolt assemblies as seen most clearly in FIG. 9. The outer periphery of annular member 118 is in turn rigidly affixed as by welding to the inner surface of a substantially cylindrical inner boom portion 120 which is adapted to be supported in substantially concentric spaced relationship within the outer boom portion 50 previously described. In the position shown in FIG. 2b, the outer end of the inner boom portion 120 is illustrated as being spaced outwardly of the outer end 50' of the outer boom portion, and accordingly the boom is in a slightly extended position, whereas in FIG. 9, the inner boom portion is illustrated in its fully withdrawn position within the outer boom portion. Members 116 and 118 are secured to one another as seen in FIG. 9 by screw members 122 threaded into suitable holes provided in members 116 and 118.

Referring now particularly to FIGS. 1 and 2a, power-operated boom elevating means comprises a pair of hydraulic cylinders 130 and 132 including lower reduced attaching end portions 130' and 132' which are mounted for pivotal movement about suitable pivot pins mounted in the support portions 30d and 32d previously described. It is accordingly apparent that the inner ends of these boom elevating hydraulic rams are mounted for pivotal movement about fixed axes. The piston rods 134 and 136 of hydraulic cylinders 130 and 132 respectively are connected with the pistons slidably disposed within the hydraulic cylinders, and the outer ends of these piston rods are adapted to be connected with different portions of connecting means mounted on the boom.

The connecting means for the power-operated boom elevating rams 130 and 132 includes an upper connecting means indicated generally by reference numeral 140 and a lower connecting means indicated generally by reference numeral 141. These connecting means may be referred to as first and second saddle means the purpose of which is to provide two spaced pivotal mounting means for interconnection with the elevating rams at opposite sides of the boom means.

Connecting means 140 includes a pair of spaced plates 142 and 144 which are disposed substantially parallel with one another and which are fixed at the lower edge portions thereof to the sides of the outer boom portion 50. Plates 142 and 144 are interconnected by a cross brace member 146 the cross sectional configuration of which may be most clearly seen in FIG. 2a, it being understood that the lower edges of member 146 are of arcuate configuration to fit snugly about the outer surface of boom portion 50, while the opposite side edges of member 146 are disposed flush against the inner surfaces of plates 142 and 144. These various components are rigidly interconnected with one another as by welding or the like. A tubular member 148 as seen in FIG. 1 also rigidly interconnects plates 142 and 144 with one another.

A pair of generally arcuate bracket members 150 and 152 are fixedly secured to plates 142 and 144 and extend outwardly from the outer surfaces thereof, these bracket members serving to support pin means 154 which is adapted to be pivotally interconnected with the outer ends of piston rods 134 and 136 at opposite sides of the upper connecting means. Suitable locking pins may be provided for ensuring that the outer ends of the piston rods remain in the desired operative relationship as illustrated.

The lower connecting means 141 includes a pair of spaced plates 160 and 162 which are disposed substantially parallel with one another and which have the upper edge portions thereof as seen in the drawings rigidly affixed to the outer surface of boom portion 50 as by welding or the like. These plates are interconnected by a cross brace member 164 the cross sectional configuration of which may be seen most clearly in FIG. 2a, it being understood that the upper surfaces of member 164 are arcuate so as to conform to the outer surface of boom portion 50, while the opposite side edges of member 164 are disposed flush with the inner faces of plates 160 and 162. These various members are rigidly interconnected with one another as by welding or the like. A further cross brace member 168 of generally U-shaped cross sectional configuration is fixed between the inner faces of plates 160 and 162 to rigidify the structure.

A pair of similar arcuate bracket members 166, only one of which is seen in the drawings, are secured to the outwardly facing surfaces of plates 160 and 162 and serve to support pivot pins 170 at opposite sides of the connecting means whereby the outer ends of piston rods 134 and 136 may be selectively pivotally interconnected therewith when desired, suitable locking pin means being provided for locking the piston rods in such operative position.

Winch mounting means includes a winch mounting plate 174 which is suitably secured to a pair of plates 176 and 178 which are rigidly affixed to opposite sides of the outer boom portion 50 as by welding or the like. Mounting plate 174 as seen most clearly in FIG. 2a is provided with a pair of longitudinally extending slots 180 adapted to receive suitable attaching means for securing a winch in operative position. It will be understood that the winch means is employed when the apparatus is used as a crane, and accordingly the winch is not illustrated in FIGS. 1, 2a or 14.

As seen most clearly in FIGS. 1, 2b and 14, anti-friction support means for supporting the inner portion of the boom so as to facilitate relative longitudinal movement thereof with respect to the outer portion of the boom comprises two sets of rollers indicated generally by reference numerals 184 and 186. Each set of rollers 184 and 186 includes four rollers circumferentially spaced about the outer boom portion 50 at 90° intervals, these rollers being supported by the outer boom portion and extending through suitable openings hereinafter described in such outer boom portion inwardly into engagement with the outer surface of the inner boom portion. It will be noted that the two sets of rollers are longitudinally spaced along the outer boom portion so as to support the inner boom portion at spaced longitudinal points thereof. Each of the various rollers is of substantially identical construction, and the details of construction of rollers 184 are illustrated in FIGS. 5 and 6, it being understood that the rollers 186 are of substantially identical configuration and the details of construction of the rollers 186 have been given the same reference numerals primed as those of rollers 184 shown in FIGS. 5 and 6 wherever such details of rollers 186 appear on the drawings.

Referring now particularly to FIGS. 5 and 6, each of the rollers is supported by bracket means including a pair spaced side plates 190 and 192 which are substantially parallel with one another and which extend longitudinally of the boom. These side plates 190 and 192 are secured as by welding at the inner surfaces thereof to the outer surface of outer boom portion 50. The two side plates 190 and 192 are interconnected with one another by cross brace members 194 and 196, these cross brace members 194 and 196 either being formed integral with side plates 190 and 192 or having the opposite ends thereof rigidly affixed to said side plates so as to provide a rigid bracket structure. A pair of rotatably adjustable support members 198 and 200 are provided, these support members having substantially cylindrical outer surfaces which are rotatably journalled within holes 202 and 204 provided in side plates 190 and 192 respectively. The end walls of support members 198 and 200 are provided with central holes 206 and 208 respectively, these support members also having eccentric cylindrical recesses 210 and 212 formed therein which are adapted to support a shaft 220 therewithin. Roller bearings 222 are in turn supported about the periphery of shaft 220 and serve to rotatably support a roller 224 on shaft 220. It will be noted that the outer periphery of roller 224 is of arcuate configuration so as to fit snugly about the outer periphery of the inner boom member 120 so that the inner boom member 120 can readily move longitudinally of the boom structure along such rollers. These rollers extend inwardly through slot 226 provided through the outer boom portion 50.

Support members 198 and 200 have plate members 230 and 232 secured thereto and extending radially outwardly thereof. Plate member 232 has three spaced holes 236 formed therethrough, and the adjacent side plate 192 has seven spaced and tapped holes 238 formed therein. A lock screw 240 is adapted to be inserted through one of holes 236 and threaded into one of holes 238 so as to lock the support member 200 in any desired position relative to the side plate 192. In a similar manner, plate 230 is provided with three spaced holes which are adapted to be aligned with one of seven holes provided in side plate 190 for receiving a lock screw 240 within aligned holes to lock support member 198 in a desired position.

It will be apparent that the support members 198 and 200 serve to provide an adjustment for the position of shaft 220 so that by rotating the two support members, the position of the shaft can be varied to move the roller 224 radially inwardly or outwardly with respect to the outer boom portion. It will be evident that the adjutsment means at opposite ends of the shaft is symmetrical so that the shaft may be accurately adjusted. It is evident that seven adjusted positions are provided, and the amounts of movement and number of adjusted positions may be varied according to the requirements.

Since each of rollers 224 spaced at 90° intervals about the outer boom portion may be adjusted radially inwardly or outwardly, it will be apparent that the position of the inner boom portion with respect to the outer boom portion may be adjusted to thereby ensure that the inner boom portion remains accurately centered with respect to the outer boom portion.

As seen most clearly in FIGS. 1, 2a and 14, guide means for preventing relative rotation of the inner boom portion with respect to the outer boom portion includes a plurality of guide portions indicated generally by reference numeral 250 and disposed in circumferentially spaced relationship about the outer boom portion intermediate the two sets of longitudinally spaced rollers and positioned closer to the set of rollers 186 than to the set of rollers 184. As seen most clearly in FIGS. 7 and 8, these guide portions 250 are positioned at 90° intervals about the outer boom portion and are offset 45° from the positions of the guide rollers.

Each of guide portions 250 includes a pair of substantially parallel side plates 252 and 254, these side plates fitting snugly within opposite sides of slots extending longitudinally of the outer boom portion 50, side plates 252 and 254 being suitably secured as by welding in the operative position illustrated. These side plates are adapted to support wear shoes 256 and 258, the inner faces of these wear shoes being disposed substantially parallel with one another for engaging cooperating guide means fixed to the outer surface of the inner boom portion. The wear shoes may be formed of a suitable anti-friction material such as brass or the like. Suitable shims 260 and 262 may be interposed between the side plates and the associated wear shoes for positioning the wear shoes in proper spaced relationship to one another. While two shims have been shown between each wear shoe and its associated side plate, it is apparent that the number of shims may be varied in accordance with the desired spacing.

Screws 264 and 266 are adapted to be threaded through aligned holes in members 252, 256 and members 254, 258 respectively, there being two such screws associated with each side plate and the adjacent associated wear shoe for holding the wear shoes in operative position. The shims 260 and 262 are provided with suitable slots therein for allowing passage of the screws. It is apparent that the wear shoes may be changed and adjusted in their spacing from time to time as required.

Four equally spaced longitudinally extending guide strips 270 are secured to the outer surface of the inner boom portion, the guide strips being so positioned as to ride between pairs of facing wear shoes of the various guide portions. Each of these guide strips is provided with a plurality of spaced slots 272 therein whereby the guide strips may be welded to the outer surface of the inner boom portion along the lower edges of these slots. It is apparent that interengagement of the guide strips 270 and the associated wear shoes 256 and 258 will serve to guide longitudinal movement of the inner boom portion with respect to the outer boom portion and to prevent relative rotation therebetween. The guide strips are provided along a sufficient portion of the longitudinal extent of the inner boom portion so as to ensure that the inner boom portion is guided by the guide means throughout the extent of longitudinal movement of the inner boom portion.

Figure 12:
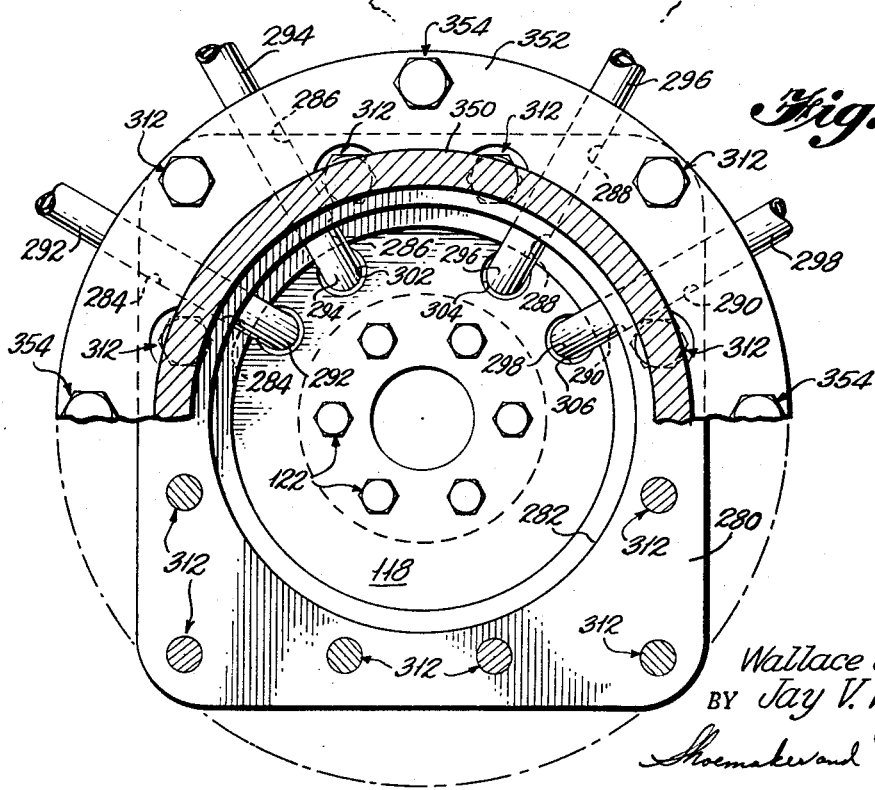
FIG. 12 is a sectional view taken substantially along line 12—12 of FIG. 9 looking in the direction of the arrows.

Referring now particularly to FIGS. 9 and 12 of the drawings, a member 280 has the inner periphery 282 thereof disposed in surrounding relationship to the outer end of the inner boom portion 120 and is rigidly affixed thereto as by welding or the like. As seen especially in FIG. 12, member 280 has a generally square outer configuration rounded at the corners and four radially extending passages 284, 286, 288 and 290 are formed through the wall of member 280 for receiving fluid conduits 292, 294, 296 and 298 respectively, these fluid conduits passing inwardly through holes 300, 302, 304 and 306 formed in member 118 previously described. These fluid conduits are connected with a suitable source of fluid pressure as hereinafter described and extend radially outwardly of the outer end of the inner boom portion for connection with certain hydraulically operated components as hereinafter described.

The excavator and grader attachment means includes a mounting plate 310 having twelve holes formed therein which receive twelve screws 312 extending through the holes formed in mounting plate 310 and threaded into aligned holes provided around the outer periphery of member 280. These screws 312 permit the mounting plate to be readily mounted in the operative position illustrated or demounted therefrom as desired.

As seen particularly in FIGS. 9 and 10, power-operated means is indicated generally by reference numeral 320, this rotator means being suitably mounted as by screws or the like on the mounting plate 310. As seen most clearly in FIG. 10, rotator means 320 includes a generally cylindrical housing portion 321 having a solid body portion 322 therewithin which is drilled to provide fluid passages 324 and 326 opening into the interior of the rotator means. Fluid conduits 328 and 330 are threaded into the outer ends of passages 324 and 326 and pass outwardly through suitable holes provided in housing portion 321 and the surrounding housing hereinafter described. The fluid conduits described up to this point may be of relatively rigid construction and formed of metal or the like. The outer end of fluid conduit 332 is interconnected with the outer end of fluid conduit 296 as seen most clearly in FIG. 13 by a flexible fluid conduit 332. In a similar manner, the outer end of fluid conduit 330 is interconnected with the outer end of fluid conduit 294 by means of flexible fluid conduit 334. These flexible conduit portions enable the interconnection between the rigid conduit portions to be readily made or broken when assembling or disassembling the attachment means with respect to the boom.

Referring again to FIG. 10, a suitable body of liquid 340 is disposed within the hollow interior of the rotator means, and a central shaft 342 is suitably rotatably journalled within the rotator means. A vane member 344 is affixed to shaft 342 and serves to span the space between the shaft 342 and the inner surface of the rotator means housing portion 321. It is evident that by introducing and removing liquid into the space within the rotator means at either side of the vane 344, the shaft 342 may be rotated in opposite directions through a substantial angle which is only limited by interengagement of the vane 344 with portions of body portion 322. As seen in FIG. 9, the shaft 342 terminates in a splined drive shaft portion 346.

The excavator and grader attachment means includes a cylindrical housing portion 350 having an annular member 352 disposed in surrounding relationship to one end portion thereof and rigidly affixed thereto as by welding or the like. Annular member 352 is secured to the outer periphery of mounting plate 310 by a plurality of nut and bolt assemblies 354 extending through aligned openings formed in members 310 and 352. Housing member 350 has a pair of diametrically opposite holes 356 formed therethrough for gaining access to the grease fittings hereinafter described.

A pair of spaced annular members 360 and 362 are fixedly secured to the inner surface of housing member 350 adjacent the outer end thereof, and a further annular member 364 is disposed in spanning relationship to said annular members 360 and 362, all of these members being rigidly interconnected as by welding or the like. A pair of diametrically opposite grease fittings 366 are mounted within suitable passages provided in annular member 364, these grease fittings being accessible through the aforementioned holes 356.

An annular bronze bearing 370 is mounted within member 364 and serves to rotatably support therewithin a shaft 372 having a recess 374 formed at the inner end thereof. A member 376 includes a generally cylindrical reduced longitudinally extending portion 378 which fits snugly within recess 374 and is spaced from the bottom thereof, member 376 also including a radially outwardly extending flange portion 380. This flange portion 380 is attached to shaft 372 by means of a plurality of screws 382 threaded through aligned openings provided in flange 380 and the adjacent end of shaft 372. Member 376 also includes a central splined hole 384 which receives the splined end 346 of the drive shaft of the rotator means whereby rotation of the rotator means will cause corresponding rotation of shaft 372.

As seen most clearly in FIGS. 2b, 9 and 13, the tool or bucket support means includes a plate 390 having a central hole formed therethrough which snugly receives shaft 372, plate 390 being rigidly secured to the shaft and extending at substantially right angles to the longitudinal axis of the shaft. An annular member 392 is disposed about shaft 372 in abutting relationship with plate 390, these components being rigidly interconnected with one another as by welding or the like. A pair of substantially parallel flat plates 392 and 394 extend normally outwardly from plate 390, and a reinforcing cross plate 396 has the opposite ends thereof affixed to the inner surfaces of plates 392 and 394, plate 396 having a central hole formed therethrough snugly receiving the outer end of shaft 372. The shaft 372 is fixed as by welding to cross plate 396. It is apparent that this over-all structural relationship is such that members 390, 392, 394 and 396 are all rigidly interconnected with one another and with the shaft 372 so that the shaft and the tool or bucket support means turns as a unit.

The tool in this form of he invenion comprises a more or less conventional bucket 28 having an open side portion 402, the bucket having formed on the upper edge thereof a pair of longitudinally extending substantially parallel plates 404 and 406 which are rigidly secured to the upper edge of the bucket and which have suitable support portions 408 and 410 respectively mounted at one end thereof. These support portions receive a pin 414 which is suitably secured in operative position and is pivotally received through a suitable hole provided in a reduced end portion 416 of a hydraulic cylinder 418 to provide a pivotal interconnection with one end of this power-operated means. A piston rod 420 extends outwardly of cylinder 418 and of course is connected with a piston slidably mounted within hydraulic cylinder 418.

The opposite end of piston rod 420 terminates in a hollow sleeve portion 422 having bushing means therein which receives a through pin 423 supported by bearing portions 424 and 425 mounted within plates 392 and 394 respectively. This pin 423 is maintained in operative position by a pair of collars 426 and 428 adjacent the opposite ends thereof, these collars being fitted snugly about the pin and having locking nut and bolt assemblies 430 and 432 as seen in FIG. 11 which extend through aligned holes provided in the collars and the associated ends of pin 423.

Figure 11:
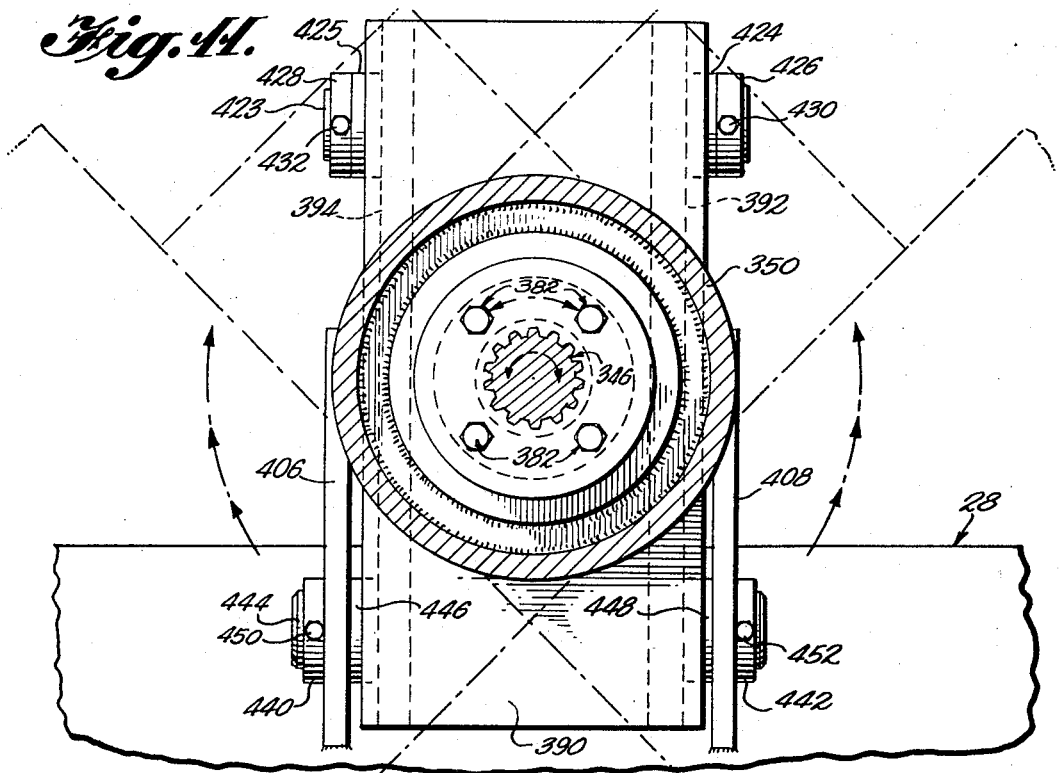
FIG. 11 is a sectional view taken substantially along line 11—11 of FIG. 9 looking in the direction of the arrows.

As seen particularly in FIG. 11, the inner ends of plates 406 and 408 are provided with bearing portions 440 and 442 respectively which receive the opposite ends of a pivot pin 444, this pivot pin being rotatably journalled within bearing portions 446 and 448 mounted in plates 394 and 392 respectively. The pivot pin 444 is retained in the operative position shown by means of nut and bolt assemblies 450 and 452 which extend through aligned holes provided in bearing portions 440 and 442 and the associated ends of the pivot pin.

It is apparent from the foregoing description of the structure supported by the tool support means that the bucket 400 is mounted for pivotal movement about the axis of pivot pin 444, and that the power-operated means 418 is pivotally interconnected between the tool support means and a portion of the bucket.

Considering now the fluid-operated system for actuating the various hydraulically controlled elements, and referring to FIG. 2a, it will be seen that a first fluid conduit 460 is connected with one end of hydraulic cylinder 130 while a second fluid conduit 462 is connected with the opposite end thereof. Similar fluid conduits are connected with opposite ends of the othter boom elevating power-operated cylinder 132. These fluid conduits are connected with any suitable source of fluid pressure mounted on the associated mobile vehicle or other supporting structure, and flow of fluid to the cylinders 130 and 132 is controlled by suitable conventional control mechanism mounted in the cab 24 previously described.

A pair of fluid conduits 464 and 466 are provided, conduit 464 being connected with a fitting 464' at one end of the extending cylinder 106, while the other fluid conduit 466 continues outwardly and is interconnected with the opposite end of cylinder 106. As seen in FIG. 3, these fluid conduits 464 and 466 pass through the holes 82 and 80 respectively provided in plate 54. The fluid conduits may be supported at any positions necessary so as to retain them in the desired operative position within the outer boom portion, and furthermore conduit 466 may be supported from cylinder 106 so as not to interfere with movement of the inner boom portion 120. Fluid conduits 464 and 466 are also connected with a suitable source of fluid pressure and flow of fluid therethrough is controlled by suitable control valve means provided in the cab of the vehicle.

Four fluid conduits 470, 472, 474 and 476 are provided, these conduits being of a flexible nature. The conduits pass through a bridle 480 which is connected with a tension spring 482 that is connected with a portion of the vehicle. The bridle and spring 482 are provided for normally withdrawing the flexible fluid conduits so that they will not tend to double up within the boom structure and become jammed. Any suitable resilient means may be employed for normally withdrawing the flexible fluid conduits.

Considering now FIG. 3 of the drawings, the various fluid conduits pass through suitable holes in the plate 54. Fluid conduits 470, 472, 474 and 476 pass through the holes 78, 72, 74 and 76 respectively into the interior of the outer boom portion. As seen in FIG. 2a, the flexible portions extend inwardly to a point adjacent the inner end of the inner boom portion 120, and as seen in FIG. 2a, fluid conduit 476 is then interconnected with a relatively rigid fluid conduit 476' which may be suitably supported in the position illustrated within the inner boom portion as by spot welding or providing suitable brackets if desired.

Figure 7:
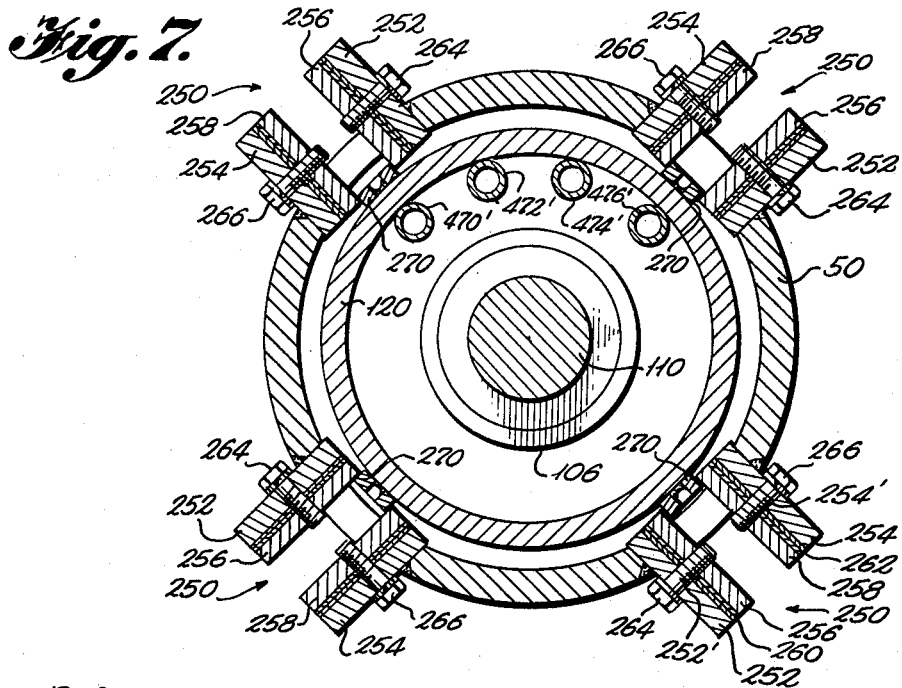
FIG. 7 is a sectional view taken substantially along line 7—7 of FIG. 2b looking in the direction of the arrows.
Figure 8:
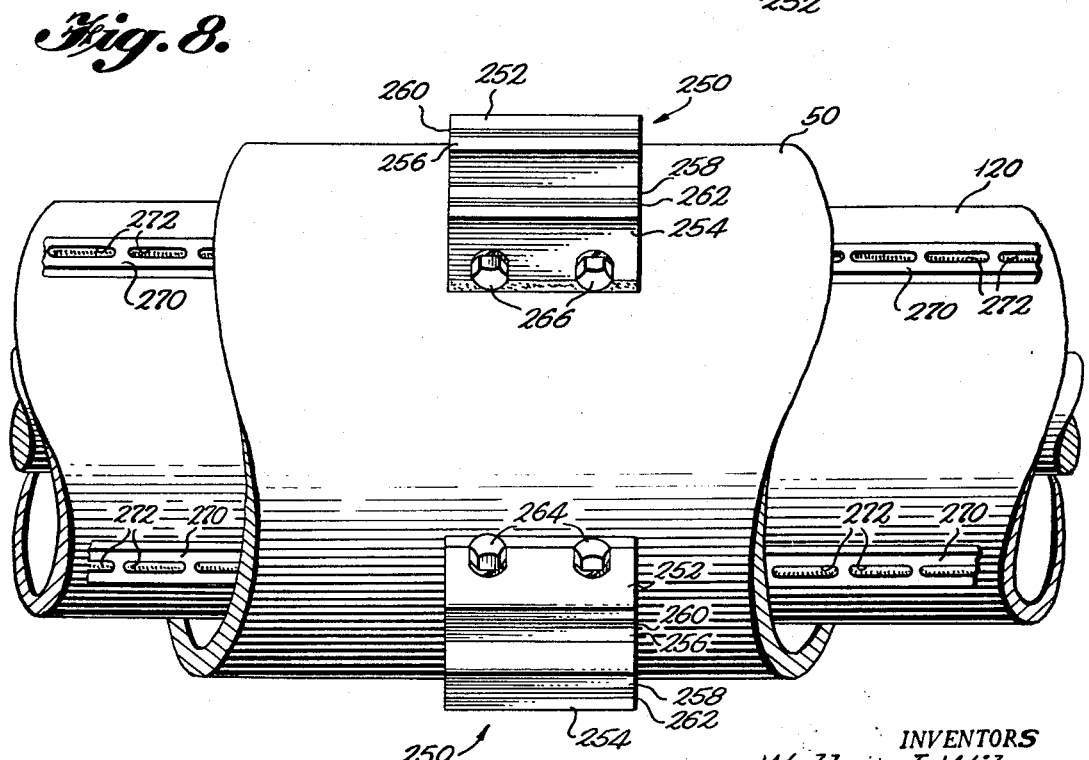
FIG. 8 is an enlarged elevation partly broken away illustrating the cooperating guide means formed on the inner and outer boom portions.

As seen in FIGS. 5 and 7, a plurality of relatively rigid conduits 470', 472', 474' and 476' are provided which are interconnected with the similarly numbered flexible conduits 470, 472, 474 and 476 respectively. These rigid conduits extend forwardly along the inner surface of the inner boom portion 120, and as seen in FIG. 9, the outer ends of these various rigid conduits extend through suitable holes provided in member 118 and are connected respectively with the conduit portions 298, 296, 294 and 292 as seen in FIG. 12. As previously described, conduits 294 and 296 are connected with the power-operated rotator means.

As seen in FIGS. 2b and 13, the outer end of conduit 292 is connected with a flexible conduit portion 490 which is in turn connected with a fitting 492 mounted on hydraulic cylinder 418. Fitting 492 is connected with a relatively rigid conduit portion 493 which in turn is connected with a fitting 494 in communication with the outer end of hydraulic cylinder 418. Fluid conduit 298 is connected with a flexible conduit portion 496 which in turn is connected with a fitting 498 in communication with the inner end of the hydraulic cylinder 418.

The fluid conduits 472 and 474 are connected with a suitable source of pressure on the vehicle and flow of fluid therethrough is controlled by a suitable valve means provided in the cab of the vehicle. These two fluid conduits are operatively connected with the rotator means so that by controlling the flow of fluid therethrough, the rotator means may be moved in opposite directions so as to rotate the tool support means as well as the bucket supported thereby about an axis extending substantially parallel with the longitudinal axis of the boom.

The fluid conduits 470 and 476 are connected with the source of fluid pressure on the vehicle and flow of fluid therethrough is controlled by suitable valve means in the cab of the vehicle. These last-mentioned fluid conduits are operatively connected with the hydraulic cylinder 418 pivotally connected between the tool support means and the bucket, and by selectively controlling the flow of fluid therethrough, the bucket may be pivoted about the axis of pivot pin 444 so as to adjust the pivotal position of the bucket on the tool support means.

Referring now to FIG. 14 of the drawings, the apparatus is illustrated in the operative interconnected relationship for use as an excavator and grader means with the excavator and grader attachment means supported at the outer end of the inner boom portion 120. It will be noted that in this operative position, the inner end of the outer boom portion 26 is pivotally interconnected for pivotal movement about the bearing portions 30a of plate 30. The boom elevating hydraulic cylinder 130 is connected with the upper saddle means 140 provided on the outer boom portion. In the full line position, the inner boom portion 120 is illustrated in its fully extended position with the bucket pivoted so as to provide the maximum reach from the vehicle. It will be noted in this position that the edge of the bucket is adapted to engage the ground at a point 500 and the entire boom and bucket structure may be swung downwardly through an angle of approximately 45° to the phantom line position 502, this position representing the maximum downward angular position of the boom. When this position is reached, the bucket can then be pivoted about pin 444 on the tool support means and by suitably pivoting the bucket and drawing the inner boom portion inwardly, the hole may be completed in the ground and the bucket may be drawn substantially vertically upwardly along a line 504.

Referring again to the full line position shown in FIG. 14, the boom can be swung upwardly through an angle of approximately 30° to the phantom line position 506 which represents the upper extent of angular movement of the boom means. It is apparent that the boom may be swung through a wide angle of 75°, and that the pivotal movement of the bucket with respect to the outer end of the boom enables considerable maneuverability of the bucket. In addition, the bucket may be rotated at the outer end of the boom through an angle of approximately 280° so as to position the bucket in many different positions for use as a grader or for digging V-shaped trenches and similar uses. The bucket itself may be swung through an angle of approximately 120° about the axis of pivot pin 444 by the action of hydraulic cylinder 418 due to the pivotal interconnection between this hydraulic cylinder, the bucket and the tool support means.

Referring now to FIG. 2a of the drawings, the outer boom portion 50 is illustrated in full lines as being supported at the upper end of plate 30. In the phantom line position 510, the outer boom portion is illustrated as pivotally supported about the support portion 30c of plate 30. In this phantom line position, the boom means is operatively mounted for use as a trench hoe. This latter operative position permits efficient operation as a trench hoe, and the various components may be maneuvered in a manner similar to that previously described.

It will be readily understood that the boom elevation is controlled by the operation of hydraulic cylinders 130 and 132 while the degree of extension of the inner boom portion 120 is controlled by the operation of hydraulic cylinder 106. The position of the bucket about its supporting pivot pin is controlled by the operation of hydraulic cylinder 418, and the degree of rotation of the bucket means is controlled by the rotator means 320.

These various hydraulically controlled elements may be operated substantially simultaneously or in any controlled sequence to provide desired operation of the apparatus. The inner boom portion will be supported upon the two sets of rollers 184 and 186, and the inner boom portion will be guided for longitudinal movement by the guide portions 250 which prevent relative rotation between the inner and outer boom portions.

As the inner boom portion is extended to its outermost limit, there may be a tendency for the inner boom portion to bend somewhat when subjected to high loading. If such bending does take place, the tubular adapter means 114 previously described will readily bend so that the piston rod 110 operatively associated with hydraulic cylinder 106 is not bent. It will accordingly be evident that the adapter means 114 prevents the piston rod 110 from being bent so that it will continue to readily reciprocate within its associated hydraulic cylinder thereby ensuring that the apparatus will continue to operate in an effective manner.

Referring now to FIGS. 15 through 17 inclusive, the apparatus is illustrated as assembled for use as a crane means wherein a crane attachment means 520 is mounted at the outer end of the inner boom portion 120. This crane attachment means includes a mounting plate 522 having a configuration substantially complementary to the configuration of the outer end of member 280 mounted at the outer end of the inner boom portion. Plate 522 is secured to member 280 by a plurality of screws 524 extending through suitable holes provided in the plate 522 and being threaded into the threaded holes provided in member 280 as previously described.

The attachment means includes a pair of substantially flat parallel plates 530 and 532 having the edge portions thereof rigidly affixed as by welding to the outer face of the mounting plate 522. A pair of stiffener plates 534 and 536 are secured respectively to the outwardly facing surfaces of plates 530 and 532 and are interconnected with the outwardly facing surface of plate 522 to rigidify the structure. A further reinforcing member 540 which as seen in FIG. 16 is of generally U-shaped cross-sectional configuration is fixedly secured between the inner faces of plates 530 and 532 and is interconnected with the outwardly facing surface of plate 522.

As seen in FIG. 16, a support portion 540 is provided between plates 530 and 532 and is rigidified by a pair of gusset members 542 and 544 which extend between the outer surface of the support portion and the inner face of plate 532. A dead-end pin 546 is suitably supported in the support portion to form a dead end for the cable reeved over the sheaves of the attachment means.

As seen particularly in FIG. 17, a pair of support portions 550 and 552 are mounted within plates 530 and 532 respectively and are adapted to support therein a pin member 554 which is retained in operative position by a pair of nuts 556 and 558 threaded on opposite threaded ends of the pin. The pin serves to rotatably support a sheave member 560.

A further pair of bearing portions 564 and 566 are mounted within plates 530 and 532 respectively and serve to support a pin 568 which is retained in operative position by a pair of nuts 570 and 572 threaded on the opposite threaded ends thereof. This pin serves to rotatably support a pair of sheaves 574 and 576 disposed in side-by-side relationship to one another.

Referring now to FIG. 15, a suitable power-operated winch 580 is mounted upon the winch support plate 174. A cable 582 is connected with winch 580, the cable being reeved over the sheaves provided as aforementioned in the crane attachment means and extending therebelow for connection with a tackle block 584 which has a suitable hook member 586 suspended therefrom.

As seen in full lines in FIG. 15, the inner boom portion is illustrated in its fully extended position relative to the outer boom portion, and it will be noted that the inner end of the outer boom portion is pivotally supported about a pin mounted in the support portion 30b of plate 30. It will further be noted that in the assembled relationship of the apparatus for use as a crane, the power-operated boom lifting cylinder 130 is pivotally interconnected with the lower saddle means 141 connected with the outer boom portion 50. With this particular pivotal interrelationship of the various components, the boom may be swung from the full line position upwardly through an angle of approximately 75° to the phantom line position 590. This provides the desired degree of movement of the boom when the apparatus is used as a crane and wherein the particular crane attachment means of the present invention is secured to the outer end of the boom.

It will be understood that the excavator and grader attachment means as well as the crane attachment means may be interchangeably employed with a boom means on any particular vehicle. As seen in FIG. 15, a slightly modified form of vehicle is illustrated wherein portions similar to the vehicle previously described have been given the same reference numerals primed. It is apparent that the particular supporting means or vehicle may be varied as desired for any particular application.

It is apparent from the foregoing that there is provided according to the present invention apparatus which can be readily converted for efficient operation either as an excavator and grader or as a crane. The boom portions are of substantially cylindrical construction so as to take loading in all directions and the boom portions do not rotate with respect to one another thereby eliminating the necessity of providing special bearings for permitting such rotation as has been common in the prior art. The excavator and grader attachment means is adapted to provide rotation of the bucket or other excavator and grader tool mounted at the outer end of the boom, and further this bucket is mounted for pivotal movement without the requirement of any special linkage from the hydraulically operated power means thereof to the bucket, such power-operated means in the present invention being pivotally interconnected directly between the bucket and the tool support means. This provides maximum versatility of the apparatus and yet enables a relatively simple and inexpensive construction which is quite effective and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Excavator and grader or crane apparatus comprising support means, boom means including an outer substantially cylindrical portion and an inner substantially cylindrical portion supported within said outer portion in concentric spaced relation thereto for relative movement longitudinally thereof, said outer boom portion being pivotally supported at the inner end thereof to said support means, power-operated lifting means pivotally connected at the inner end thereof to said support means and being pivotally connected at the outer end thereof to said outer boom portion, power-operated extending means connected with said inner boom portion for moving said inner boom portion inwardly and outwardly with respect to said outer boom portion, said inner boom portion having attachment mounting means at the outer end thereof for securing an attachment thereto, anti-friction support means supported on said outer boom portion comprising rollers having arcuate engaging surfaces, said rollers being circumferentially spaced about said outer boom portion and engaging said inner boom portion for facilitating relative longitudinal movement of said inner boom portion with respect to said outer boom portion, and cooperating guide means on said inner and outer boom portions at circumferentially spaced positions thereon and disposed at circumferential portions intermediate said anti-friction rollers to avoid interference between said rollers and said guide means for preventing relative rotation between said inner and outer boom portions.

2. Excavator and grader or crane apparatus comprising support means, boom means including an outer substantially cylindrical portion and an inner substantially cylindrical portion supported within said outer portion in concentric spaced relation thereto for relative movement longitudinally thereof, said outer boom portion being pivotally supported at the inner end thereof to said support means, power-operated lifting means pivotally connected at the inner end thereof to said support means and being pivotally connected at the outer end thereof to said outer boom portion, power-operated extending means connected with said inner boom portion for moving said inner boom portion inwardly and outwardly with respect to said outer boom portion, said inner boom portion having attachment mounting means at the outer end thereof for securing an attachment thereto, anti-friction support means supported on said outer boom portion and engaging said inner boom portion for facilitating relative longitudinal movement of said inner boom portion with respect to said outer boom portion, and cooperating guide means on said inner and outer boom portions for preventing relative rotation between said inner and outer boom portions, said support means including a plurality of spaced support portions for pivotally supporting the inner end of the boom at different positions on said support means, said outer boom portion having power-operated lift connecting means thereon including an upper connecting means and a lower connecting means spaced a substantial distance from one another so that the outer end of the power-operated lift means may be pivotally interconnected with either said upper or said lower connecting means in accordance with the position at which the inner end of the outer boom portion is pivotally interconnected with said support means.

3. Apparatus as defined in claim 2 wherein said anti-friction support means for the inner boom portion includes a first plurality of circumferentially spaced rollers supported by said outer boom portion and a second plurality of circumferentially spaced rollers supported by said outer boom portion, said first and second plurality of circumferentially spaced rollers being spaced longitudinally along said outer boom portion for supporting spaced longitudinal points along said inner boom portion, and means for adjusting the radial position of said rollers to enable proper centering of said inner boom portion with respect to said outer boom portion.

4. Apparatus as defined in claim 3 wherein said means for adjusting the radial position of said rollers comprises a shaft for supporting each of said rollers, each of said shafts being eccentrically mounted within a rotatably adjustable support member whereby rotation of said adjustable support member will vary the radial position of the associated roller.

5. Apparatus as defined in claim 2 wherein said guide means for preventing relative rotation between said inner and outer boom portions comprises a plurality of spaced guide shoes supported by said outer boom portion, said inner boom portion having a plurality of longitudinally extending guide strips supported on the outer surface thereof for engaging said guide shoes.

6. Apparatus as defined in claim 2 including a tubular adapter means, the outer end of said power-operated extending means being pivotally interconnected with the inner end of said adapter means, the outer end of said adapter means being interconnected with the outer end of said inner boom portion.

7. Apparatus as defined in claim 6 wherein the inner end of said power-operated extending means is pivotally interconnected with the inner end of said outer boom portion.

8. Apparatus as defined in claim 2 including a plurality of hydraulic conduits extending through the inner end of said outer boom portion, some of said hydraulic conduits being connected with said power-operated extending means, others of said hydraulic conduits extending within said inner boom portion and being supported thereby and passing out through the outer end of said inner boom portion.

9. Apparatus as defined in claim 1 including an excavator and grader attachment means secured to said attachment mounting means at the outer end of said inner boom portion, said attachment means including a tool support means, said tool support means being mounted for rotation about an axis extending substantially parallel with the longitudinal axis of said boom, power-operated rotator means operatively connected with said tool support means for rotating said tool support means, a tool pivotally interconnected with said tool support means, and power-operated means connected between said tool support means and said tool for pivoting said tool with respect to said tool support means.

10. Apparatus as defined in claim 9 wherein said last-mentioned power-operated means has the inner end thereof pivotally connected with said tool support means and the outer end thereof pivotally connected with said tool.

11. Apparatus as defined in claim 9 wherein said attachment means includes a housing, bearing means supported within said housing, a shaft rotatably supported within said bearing means, power-operated rotator means within said housing and drivingly interconnected with said shaft, means for operating said power-operated rotator means, said tool support means being fixed to the outer end of said shaft.

12. Apparatus as defined in claim 2 including excavator and grader attachment means secured to the attachment mounting means at the outer end of said inner boom portion, said attachment means including rotatably supported tool support means, power-operated rotator means for selectively rotating said tool support means, a tool pivotally interconnected with said tool support means, and further power-operated means connected between said tool support means and said tool for selectively pivoting said tool with respect to said tool support means.

13. Apparatus as defined in claim 12 wherein said last-mentioned power-operated means has the inner end thereof pivotally interconnected with said tool support means and the outer end thereof pivotally interconnected with said tool.

14. Apparatus as defined in claim 12 wherein said anti-friction support means for said inner boom portion comprises a plurality of rollers rotatably supported by said outer boom portion and engaging the outer surface of said inner boom portion, means for radially adjusting said rollers to ensure that said inner boom portion is centered with respect to said outer boom portion, said guide means for preventing relative rotation between said inner and outer boom portions comprising a plurality of guide shoes supported by said outer boom portion and a plurality of longitudinally extending guide strips supported by the outer surface of said inner guide portion and engaging said guide shoes.

15. Apparatus as defined in claim 12 wherein said power-operated extending means has the inner end thereof pivotally interconnected with the inner end of said outer boom portion, tubular adapter means, the inner end of said adapter means being pivotally interconnected with the outer end of said power-operated extending means, the outer end of said adapter means being connected with the outer end of said inner boom portion whereby said adapter means is adapted to compensate for bending of the inner boom portion.

16. Apparatus as defined in claim 12 wherein said support means comprises a pair of vertically extending spaced plates each of which has a plurality of spaced support portions for supporting the inner end of said outer boom portion, said power-operated lift connecting means including a first saddle means connected with the upper part of said outer boom portion and second saddle means connected with the diametrically opposite part of said outer boom portion.

17. Apparatus as defined in claim 1 including crane attachment means secured to the attachment mounting means at the outer end of said inner boom portion, said crane attachment means including sheave means rotatably supported thereby and also including dead-end means supported adjacent said sheave means, winch mounting means supported on said outer boom portion, and a winch supported on said winch supporting means for operating a cable reeved over said sheave means.

18. Apparatus as defined in claim 2 including crane attachment means secured to the attachment mounting means at the outer end of said inner boom portion, said crane attachment means including sheave means rotatably supported thereby and also including dead-end means supported adjacent said sheave means, winch mounting means supported on said outer boom portion, and a winch supported on said winch supporting means for operating a cable reeved over said sheave means.

19. Apparatus as defined in claim 1 wherein said guide means for preventing relative rotation between said inner and outer boom portions comprises a plurality of spaced guide shoes supported by said outer boom portion, said inner boom portion having a plurality of longitudinally extending guide strips supported on the outer surface thereof for engaging said guide shoes.

References Cited

UNITED STATES PATENTS

| | | | |
|---|---|---|---|
| 3,087,636 | 4/1963 | Weaver | 214—141 |
| 3,285,431 | 11/1966 | Butcher | 214—141 X |
| 3,298,548 | 1/1967 | Long et al. | 214—138 |
| 3,300,060 | 1/1967 | Lado | 215—55 |

FOREIGN PATENTS

| | | |
|---|---|---|
| 1,279,493 | 11/1961 | France. |
| 853,762 | 11/1960 | Great Britain. |

HUGO O. SCHULZ, *Primary Examiner.*